UNITED STATES PATENT OFFICE.

GEORGE CUTLER WESTBY, OF LUDWIG, NEVADA, ASSIGNOR TO WESTERN PROCESS COMPANY, A CORPORATION OF MAINE.

PROCESS FOR THE TREATMENT OF COPPER ORES.

1,244,810.     Specification of Letters Patent.     Patented Oct. 30, 1917.

No Drawing.     Application filed August 17, 1915. Serial No. 45,917.

*To all whom it may concern:*

Be it known that I, GEORGE C. WESTBY, a citizen of the United States, residing at Ludwig, in the county of Lyon and State of Nevada, have invented certain new and useful Improvements in Processes for the Treatment of Copper Ores, of which the following is a full, clear, and exact specification.

This invention relates to the treatment of copper ores for separating out the copper, producing colcothar and strong acid gases which are useful for the treatment of fresh ore, the regeneration of the gases, and the utilization of the gases for extracting metals or other values from the calcines.

In hydro-metallurgical processes designed for the treatment of copper ores, where acids, acid salts or combination of acids and salts are used as leaching agents, and iron as the precipitant of the copper, there is constant loss of both iron and the acid radical, as in the combination $FeSO_4.7H_2O$.

The present process reduces wastes to a minimum by employing an economic regeneration of the chemical agents, and the acid radicals are directly applied to fresh ores. This process with slight variations may be used for treating oxidized copper ore, sulfid ores and mixed ores.

The first step in the treatment of oxidized copper ore may consist in the introduction of sulfuric acid solution to the ore in a tank which is preferably conical in shape so that the acid solution may be introduced at the bottom and by means of a Pachuca tube caused to rapidly circulate. The first step might also consist in causing wetted oxidized or roasted ore to fall directly or in arrested streams through a tower or chamber which is also a conduit for acid gases. In either case the net result is a solution of copper where strictly copper ores are used.

The concentrated copper solution derived from the solution of the copper in the ore, is then either run over scrap iron or passed through an electrolytic cell or cells fitted with iron anodes. The copper is thus recovered either as a precipitate or as refined metal.

The third step in the process as applied to oxidized copper ore consists in causing the solution of $FeSO_4$, which is a resultant of the second step, to flow through an evaporating device by which it is concentrated and a crystal mush of $FeSO_4.7H_2O$ separated therefrom. This evaporation of the solution of sulfates is carried out by the use of any suitable apparatus for effecting the exposure of an extremely large surface of the liquid within a limited space, for example, that illustrated in my copending application Serial 45918. The exposure of this surface to the wind or to hot gaseous currents derived from waste heat or smoke causes rapid vaporization and thus brings about the separation of crystals of $FeSO_4.7H_2O$ as the solution nears the bottom of the apparatus. The mushy crystalline mass is usually removed from the slats as it forms by the concentrated liquor accompanying it.

The crystals may then be drained from the mother liquor, if desired, or the mixture charged directly to a drier in which the excess moisture and the water of crystallization are removed. The compound $FeSO_4.7H_2O$ dissolves in its water of crystallization at comparatively low temperature and for this reason cannot advantageously be directly charged to a furnace where it might, in the case of a mechanical furnace, nodulize, thus causing a material decrease in the output and also perhaps causing mechanical troubles. To obviate this difficulty I first effect a complete dehydration of the crystalline ferrous sulfate.

The dried iron sulfate is charged directly to the top hearth of a mechanical furnace, preferably of the muffle type. This $FeSO_4$, which has already been partially oxidized to $Fe_2(SO_4)_3$, is heated in the furnace in the presence of a limited amount of air until it is converted into $Fe_2O_3$, $SO_2$ and $SO_3$.

The $Fe_2O_3$ is directly salable as a particularly pure colcothar, or it may be metallized and used over again to precipitate copper or, finally, where conditions warrant, it may be nodulized and used as iron ore.

The mixed gases developed in the decomposition of the iron sulfates may be treated to form sulfuric acid, but it is preferable to apply them directly to the oxidized ore in the leaching tank or chambers together with the sulfuric acid required to make good unavoidable mechanical or chemical losses. Where there is much lime present in the ore, the gases may be first admitted directly to the ore in order to utilize as far as possible the $SO_2$ on the gangue matter.

The acid gases are blown into the ore tank by means of compressed air admitted to muffles of a decomposing furnace, or by a blower interposed between the furnace and tank.

The treatment of sulfid ores varies somewhat in the primary stages, the ores being first subjected to sulfatizing, chloridizing or nitrating roast, or to any combination of these treatments.

If a sulfatizing or chloridizing roast is to be applied, the roast is so conducted that a large proportion of the $FeS_2$ is oxidized either to $FeSO_4$ or $Fe_2(SO_4)_3$. Ordinarily the aim has been to render the iron insoluble and the result has been to convert a part of the copper also to a less soluble form than copper sulfate, and the final result has been principally the formation of $Fe_2O_3$, $CuO$ and $CuSO_4$. By leaving a part of the iron sulfate undecomposed, a larger proportion of water-soluble copper will result. The treatment of the roasted residue is the same as in the case of the oxidized ores above described.

An alternative and preferable method is to concentrate and thus obtain a greater proportion of the sulfids with a consequent elimination of most of the gangue. To the concentrate produced, ferrous or ferric sulfate, derived from later stages of the process, may be added if desired and the mixture roasted as a whole to form colcothar. The mixed gases arising from the decomposition of the sulfids and sulfates may then be utilized by blowing them through the wetted calcines of a previous charge and also through oxidized ores in order to extract the copper. The interposition of an absorption tower in order to extract the greater part of the $SO_3$ before passing the sulfurous fumes to the ore, is sometimes desirable. This may be accomplished either by the introduction of air pressure in the muffle of the furnace or by means of a blower conveniently situated between the tower and leaching tank. A series of absorption towers may be used, and each arranged on a slightly lower level than the preceding one so that the solution will flow from one to another and make the process continuous.

Should it be desired to use nitrates or nitric acid during the course of treatment, the procedure would probably be as follows:—The sulfid, oxidized or mixed ores are treated directly with nitric acid or with solutions of nitrates to which sulfuric acid or sulfurous and nitrous fumes, coming from a later stage in the process, are added. The nitrous fumes given off are recovered in absorption towers or closed tanks containing ore and the solution derived used on fresh ore. The solution coming from the leached ore, containing nitrates, sulfates, and sulfuric acid may be passed directly over scrap iron, which will result in the precipitation of the greater part of the copper and a production of ferrous sulfate and ferrous nitrate. If conditions are favorable, the solution may, on the other hand, be immediately evaporated, and the crystalline residue dried and charged directly to a muffle furnace. In either case, the calcination will yield nitric acid, nitric oxid, nitrogen peroxid and sulfur trioxid. These gases may be drawn through an absorption tower or directly applied to fresh ores or to calcine or other residues. The calcine freed from copper and other soluble matter will in this case, as in that previously described, form a merchantable article, and the gases may be put to an economic use.

If desired, nitric acid without sulfuric acid may be used in the above method, the general procedure remaining the same.

Having thus described my invention what I claim and desire to secure by Letters Patent is:

1. The process for the treatment of oxidized ore which consists in wetting said ore, subjecting the wetted ore to the action of gaseous sulfatizing reagents, leaching out the sulfates formed, removing non-ferrous metal values therefrom, removing the solvent and drying and calcining the residue to form a pigment.

2. The process for the treatment of oxidized ore which consists in wetting said ore, subjecting the wetted ore to the action of gaseous sulfatizing reagents, leaching out the sulfates formed, subjecting the resulting solution to the action of metallic iron, removing metal values precipitated thereby, removing the solvent, drying and calcining the residue to form a pigment and acid gases, and utilizing the gases produced in the further sulfatizing of ore.

In testimony whereof I have signed my name to this specification.

GEORGE CUTLER WESTBY.